US005483939A

United States Patent [19]

Kamura et al.

[11] Patent Number: 5,483,939

[45] Date of Patent: Jan. 16, 1996

[54] CONTROL SYSTEM FOR LEAN-BURN INTERNAL COMBUSTION ENGINE

[75] Inventors: Hitoshi Kamura, Kyoto; Yasuki Tamura, Nisshin, both of Japan

[73] Assignee: Mitsubishi Jidosha Kogyo Kabushiki Kaisha, Tokyo, Japan

[21] Appl. No.: 321,026

[22] Filed: Oct. 6, 1994

[30] Foreign Application Priority Data

Oct. 12, 1993 [JP] Japan .................................. 5-254585

[51] Int. Cl.[6] .......................... F02D 41/10; B60K 41/06

[52] U.S. Cl. ........................................... 123/492; 477/111

[58] Field of Search .................................. 123/478, 480, 123/486, 492, 493; 477/107, 111

[56] References Cited

U.S. PATENT DOCUMENTS

| | | | |
|---|---|---|---|
| 4,383,456 | 5/1983 | Ganoung | 477/111 |
| 4,739,483 | 4/1988 | Ina et al. | 123/480 |
| 4,774,858 | 10/1988 | Ganoung | 477/107 |
| 4,908,765 | 3/1990 | Murakami et al. | 123/492 |
| 4,964,318 | 10/1990 | Ganoung | 477/111 |
| 5,190,008 | 3/1993 | Yamasaki et al. | 123/486 |
| 5,211,147 | 5/1993 | Ward | 123/478 |

*Primary Examiner*—Willis R. Wolfe
*Attorney, Agent, or Firm*—Evenson, McKeown, Edwards & Lenahan

[57] ABSTRACT

ECU includes a lean air/fuel ratio coefficient setting device, an accelerated stoichiometric-burn operation air/fuel ratio coefficient setting device, a meeting-of-lean-burn-operation-conditions determining device, a throttle position change detector, an acceleration criterion setting device, an end-of-acceleration determining device and an acceleration determining device. When a detected vehicle speed has been determined to be in a high-speed range faster than a threshold and an acceleration is determined to have ended, a relatively large value is set as an acceleration criterion only for a predetermined period. During a lean-burn operation, ECU compares output information from the throttle position change detector with the acceleration criterion set by the acceleration criterion setting device and if the output information is greater than the acceleration criterion, determines an accelerated operation and changes the mixing ratio of fuel to air to a stoichiometric ratio (or a rich ratio). Otherwise, the air/fuel ratio is controlled at a lean ratio.

10 Claims, 8 Drawing Sheets

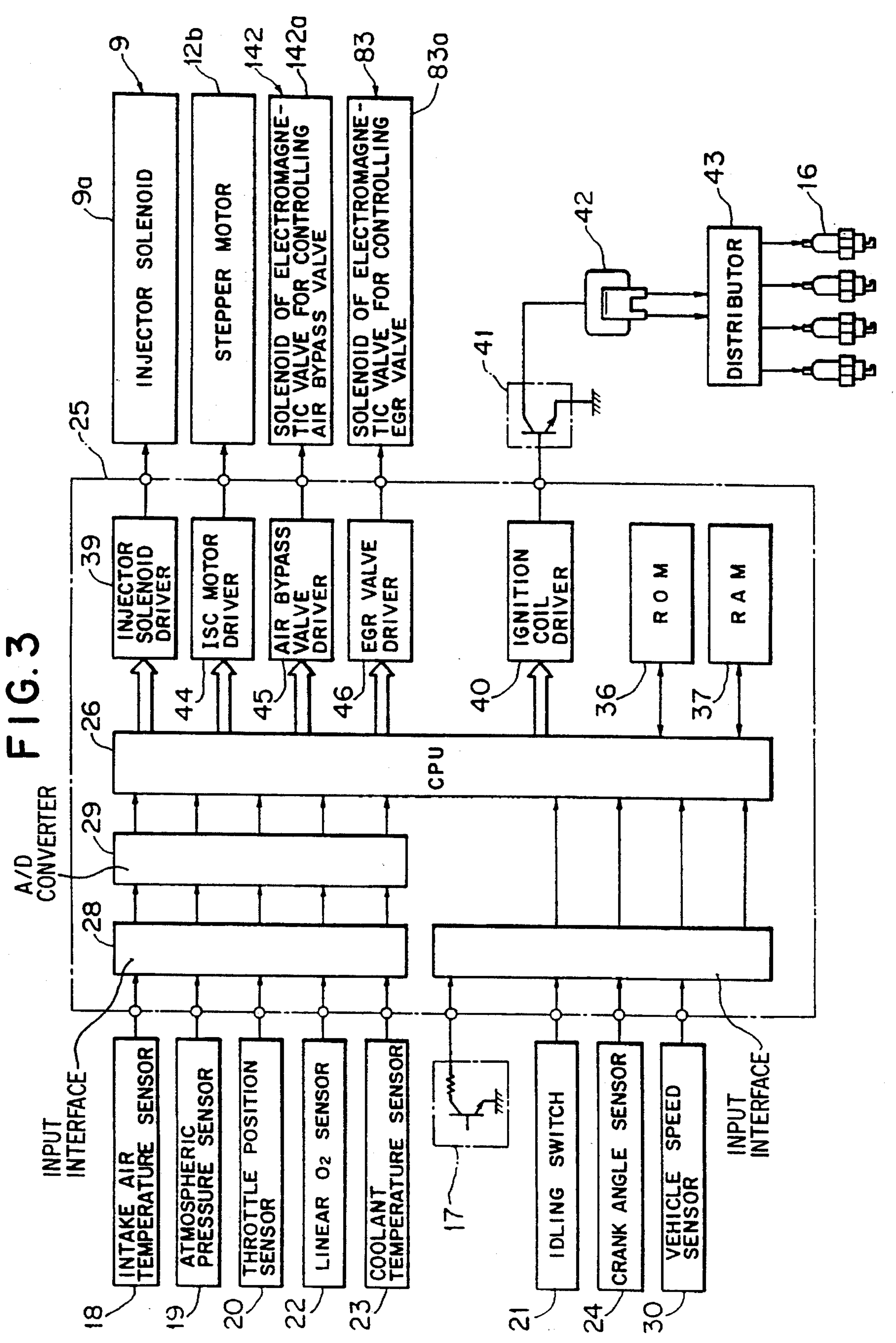
FIG. 3
INJECTOR SOLENOID
STEPPER MOTOR
SOLENOID OF ELECTROMAGNETIC VALVE FOR CONTROLLING AIR BYPASS VALVE
SOLENOID OF ELECTROMAGNETIC VALVE FOR CONTROLLING EGR VALVE
DISTRIBUTOR
INJECTOR SOLENOID DRIVER
ISC MOTOR DRIVER
AIR BYPASS VALVE DRIVER
EGR VALVE DRIVER
IGNITION COIL DRIVER
ROM
RAM
CPU
A/D CONVERTER
INPUT INTERFACE
INTAKE AIR TEMPERATURE SENSOR
ATMOSPHERIC PRESSURE SENSOR
THROTTLE POSITION SENSOR
LINEAR O2 SENSOR
COOLANT TEMPERATURE SENSOR
IDLING SWITCH
CRANK ANGLE SENSOR
VEHICLE SPEED SENSOR
INPUT INTERFACE
9
9a
12b
142
142a
83
83a
25
41
42
43
16
39
44
45
46
40
36
37
26
29
28
17
18
19
20
22
23
21
24
30

CONTROL SYSTEM FOR LEAN-BURN INTERNAL COMBUSTION ENGINE

BACKGROUND OF THE INVENTION a) Field of the Invention

This invention relates to an internal combustion engine mounted on a vehicle, and particularly to a control system for a lean-burn internal combustion engine which performs a lean-burn operation at an air/fuel ratio leaner than a stoichiometric air/fuel ratio under predetermined operation conditions.

b) Description of the Related Art

Lean-burn internal combustion engine (i.e., so-called lean-burn engines) have been provided in recent years, which perform a lean-burn operation at an air/fuel ratio leaner than a stoichiometric air/fuel ratio under predetermined operation conditions.

Even with such lean-burn engines, a reduction in the acceleration performance as well as a deterioration in exhaust gas may take place when a lean-burn operation is conducted upon acceleration. As is disclosed, for example, in Japanese Patent Application Laid-Open (Kokai) No. HEI 1-29642, it has therefore been proposed to perform control in such a way that upon acceleration, a lean-burn engine is operated by setting the air/fuel ratio at a stoichiometric or richer air/fuel ratio but upon ending of the acceleration, the air/fuel ratio is set back to a lean air/fuel ratio and the lean-burn engine is then operated at the lean air/fuel ratio.

For the above control, it is necessary to determine if the engine is in acceleration. This determination can be effected, for example, by a deviation in the throttle position. Namely, the engine can be determined to be in an accelerated state provided that the deviation of the throttle position is greater than a threshold.

In such a conventional lean-burn engine, the engine undergoes a torque down when the air/fuel ratio is changed from the stoichiometric air/fuel ratio to a lean air/fuel ratio. In a low-speed range of the engine, this torque down can be reduced to a small level by conducting an air assist, that is, by opening an air bypass valve to supplement air through an air bypass passage. In a high-speed range, however, the amount of air becomes insufficient even if an air assist is conducted through the air bypass passage, whereby a torque down of a certain degree occurs when the stoichiometric air/fuel ratio is changed to the lean air/fuel ratio. When the acceleration has ended and the air/fuel ratio has returned to the lean air/fuel ratio, the driver therefore feels a reduction in the vehicle speed. The driver may hence depress an accelerator pedal to maintain the vehicle speed. This results in a greater deviation in the throttle position so that the vehicle is determined to be in an accelerated state. The air/fuel ratio is accordingly changed from the lean air/fuel ratio to the stoichiometric air/fuel ratio. No lean-burn operation is therefore feasible although the acceleration has already ended and the engine is ready for a lean-burn operation.

For example, FIGS. 8 and 9 schematically illustrate changes in air/fuel ratio, engine torque, vehicle speed and throttle opening from the time of acceleration to after the end of the acceleration. FIG. 8 shows illustrative changes at a low speed whereas FIG. 9 depicts those at a high speed.

At the low speed, namely, as is illustrated in FIG. 8, when the air/fuel ratio is changed from the stoichiometric value for acceleration to the lean value as a result of completion of the acceleration, the engine torque naturally drops. As an air assist conducted through an air bypass passage at the time of the lean-burn operation is exhibiting its effects sufficiently, the engine however undergoes a reduced torque down so that a reduction in the vehicle speed can be limited to a slight level. The driver is therefore not tempted to substantially depress the accelerator pedal shortly after the switching to the lean air/fuel ratio. Even if the deviation of the throttle position increases, this deviation does not increase to such a value as exceeding an acceleration criterion. The lean-burn state is therefore continued.

At the high speed, on the other hand, the switching of the air/fuel ratio from the stoichiometric value to the lean value upon ending of the acceleration results in a substantial down in engine torque as shown in FIG. 9, because at the high speed, the air assist is less effective, resulting in insufficient air. In this case, the vehicle speed drops significantly so that shortly after the air/fuel ratio is changed to the lean value, the driver may substantially depress the accelerator pedal so that the deviation of the throttle position is increased beyond the acceleration criterion. As a consequence, the engine is operated at the stoichiometric air/fuel ratio although the acceleration has ended and the engine is ready for operation at the lean air/fuel ratio.

In a low-speed operation, there are generally more occasions of acceleration so that it is required to promptly respond each demand for acceleration. In a high-speed operation, however, there is generally a higher probability of performing a steady-state operation featuring less changes. Unless otherwise specifically demanded by the driver, it is hence preferred to perform a lean-burn operation so that the fuel consumption can be improved.

SUMMARY OF THE INVENTION

With the foregoing problem in view, the present invention has as a primary object the provision of a control system for a lean-burn internal combustion engine so that with a view to improving the fuel consumption especially in a high-speed operation, unnecessary switching to a stoichiometric air/fuel ratio can be avoided after the air/fuel ratio is switched from the stoichiometric value to a lean value as a result of ending of acceleration and an efficient operation at the lean air/fuel ratio can be continued.

In one aspect of the present invention, there is thus provided a control system for a lean-burn internal combustion engine mounted on a vehicle to perform a lean-burn operation at an air/fuel ratio leaner than a stoichiometric air/fuel ratio under predetermined operation conditions, comprising:

load change parameter detection means for detecting a parameter correlated to a change in load on said internal combustion engine;

vehicle speed state detection means for detecting the state of running speed of said vehicle;

means for setting an acceleration criterion;

acceleration determining means for comparing output information from said load change parameter detection means with said acceleration criterion set by said acceleration criterion setting means and when said output information is greater than said acceleration criterion, determining that said internal combustion engine is in an accelerated operation;

end-of-acceleration determining means for determining an end of said accelerated operation; and air/fuel ratio control means for controlling the mixing ratio of fuel to air, which are to be fed to said internal combustion engine, to said stoichiometric air/fuel ratio or said richer air/fuel ratio when said internal combustion engine has been determined to be in said accelerated operation by said acceleration determining means in a lean-burn operation, and then controlling said air/fuel mixing ratio back to said leaner air/fuel ratio when said accelerated operation is determined to have ended by said end-of-acceleration determining means;

wherein when the state of running speed of vehicle detected by said vehicle speed state detection means is in a high speed range and said accelerated operation is determined to have ended by said end-of-acceleration determining means, said acceleration criterion setting means changes said acceleration criterion to a greater value.

According to the control system of this invention, the acceleration criterion is changed to the greater value when the state of running speed of vehicle detected by said vehicle speed state detection means is in a high speed range and said accelerated operation is determined to have ended by said end-of-acceleration determining means. Even if an accelerator pedal is depressed by the driver, the control system does not interpret it as a driver's desire for acceleration so that the air/fuel ratio remains at the lean value. The control system therefore can improve the fuel consumption.

BRIEF DESCRIPTION OF THE DRAWINGS

FIG. 3 is a hardware block diagram illustrating a control equipment of an engine system, in which the control system has been incorporated;

DETAILED DESCRIPTION OF THE INVENTION AND PREFERRED EMBODIMENTS

Referring to FIGS. 1–7, the control system according to the embodiment of this invention will hereinafter be descried.

Figure 2:
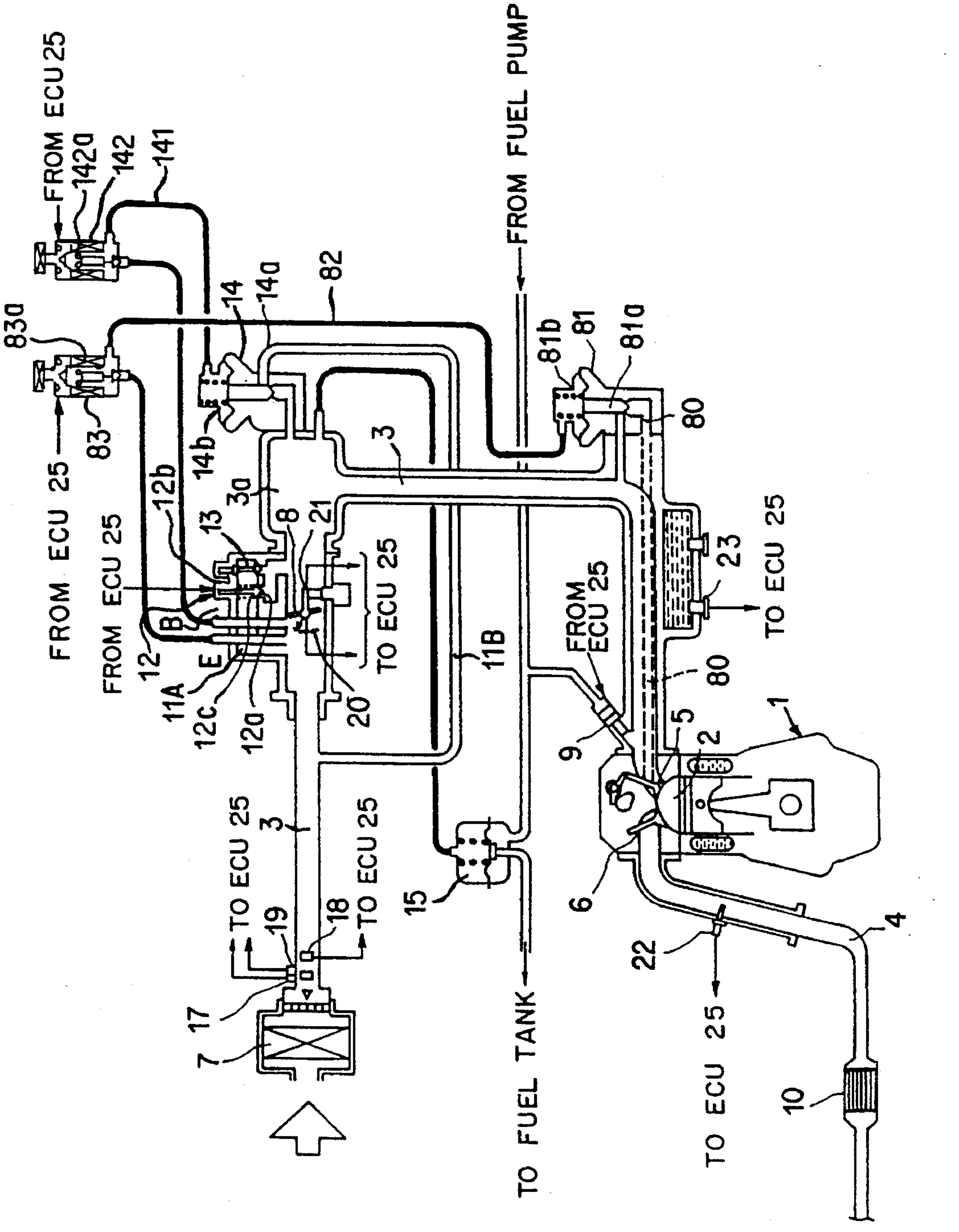
FIG. 2 is an overall construction diagram of an engine system equipped with the control system.

An engine for an automotive vehicle, said engine being equipped with the present control system, is constructed as a lean-burn engine which performs a lean-burn operation at an air/fuel ratio leaner than a stoichiometric air/fuel ration under predetermined operation conditions. This engine may be illustrated as shown in FIG. 2. In FIG. 2, the (internal combustion) engine which is designated at numeral 1 has an intake passage 3 and an exhaust passage 4, both of which are communicated to a combustion chamber 2. The communication between the intake passage 3 and the combustion chamber 2 is controlled by an intake valve 5, while the communication between the exhaust passage 4 and the combustion chamber 2 is controlled by an exhaust valve 6.

The intake passage 3 is provided with an air cleaner 7, a throttle valve 8 and an electromagnetic fuel injection valve (injector) 9, which are arranged successively from an upstream side of the intake passage 3. The exhaust passage 4, on the other hand, is provided with a three-way catalyst 10 and an unillustrated muffler (noise eliminator) successively from an upstream side of the exhaust passage 4. Incidentally, each cylinder of the engine 1 is provided with its own injector 9. Further, the exhaust passage 3 is provided with a surge tank 3*a*.

The three-way catalyst 10 is to eliminate CO, HC and NOx while the engine is operated at the stoichiometric air/fuel ratio, and is of a known construction.

The throttle valve 8 is connected to an accelerator pedal (not shown) via a wire cable so that the position of the throttle valve 8 is regulated according to the stroke of the accelerator pedal.

The intake passage 3 is provided with a first bypass passage 11A which extends bypassing the throttle valve 8. Inserted in this bypass passage 11A is a stepper motor valve (hereinafter called the "STM valve") 12 which functions as an ISC (idling speed control) valve. In the first bypass passage 11A, a first idling air valve 13 of the wax type whose opening is regulated according to the temperature of an engine coolant is also arranged in a side-by-side relationship with the STM valve 12.

The STEM valve 12 is constructed of a valve element 12*a* which can be brought into contact with a valve seat portion formed in thè first bypass passage 11A, a stepper motor (ISC actuator) 12b for controlling the position of the valve element, and a spring 12*c* normally biasing the valve element against the valve seat portion (i.e., in the direction that the bypass passage 11A is closed by the valve element).

By adjusting the position of the valve element 12*a* stepwise (according to the number of steps) relative to the valve seat portion by the stepper motor 12*b*, the opening between the valve seat portion and the valve element 12*a*, that is, the position of the STM valve 12 can be controlled.

By controlling the position of the STM valve 12 in accordance with an electronic control unit (ECU) 25, which will be described subsequently herein, intake air can be fed to the engine 1 through the first bypass passage 11A irrespective of operation of the accelerator pedal by the driver. By changing the position of the STM valve 12, the quantity of air to be inducted through the throttle bypass passage 11A can be controlled.

As an ISC actuator, a DC motor can also be used instead of the stepper motor 12*b*.

The intake passage 3 is additionally provided with a second bypass passage 11B which also extends bypassing the throttle valve 8. An air bypass valve 14 is inserted in the second bypass passage 11B.

The air bypass valve 14 is constructed of a valve element 14*a* which can be brought into contact with a valve seat portion formed in the second bypass passage 11B and a diaphragm-type actuator 14*b* for controlling the position of the valve element 14*a*. Connected to a diaphragm compartment of the diaphragm-type actuator 14*b* is a pilot passage 141 which is in communication with the intake passage 3 on a side upstream the throttle valve 8. An air-bypass-valve-controlling electromagnetic valve 142 is inserted in the pilot passage 141.

By controlling the position of the air-bypass-valve-controlling electromagnetic valve 142 with ECU 25 which will be described subsequently herein, it is also possible to supply intake air into the engine 1 through the second bypass passage 11B irrespective of an operation of the accelerator pedal by the driver. Further, the quantity of air to be inducted while bypassing the throttle valve 8 can be controlled by changing the position of the air-bypass-valve-controlling electromagnetic valve 142. Incidentally, it is the basic mode of operation of the air-bypass-valve-controlling electromagnetic valve 142 that it is open in a lean-burn operation but is otherwise kept closed.

Between the exhaust passage 4 and the intake passage 3, an exhaust gas recirculation passage (EGR passage) 80 is inserted to return exhaust gas to the intake system. An EGR valve 81 is inserted in the EGR passage 80.

The EGR valve 81 is constructed of a valve element 81*a* which can be brought into contact with a valve seat portion formed in the EGR passage 80 and a diaphragm-type actuator 81*b* for controlling the position of the valve element 81*a*. Connected to a diaphragm compartment of the diaphragm-type actuator 81*b* is a pilot passage 82 which is in communication with the intake passage 3 on a side upstream the throttle valve 8. An EGR-valve-controlling electromagnetic valve 83 is inserted in the pilot passage 82.

By controlling the position of the EGR-valve-controlling electromagnetic valve 83 with ECU 25 which will be described subsequently herein, exhaust gas can be returned to the intake system through the EGR passage 80.

In FIG. 2, numeral 15 indicates a fuel pressure regulator. This fuel pressure regulator 15 is actuated responsive to a negative pressure in the intake passage 3 to control the quantity of fuel to be returned from an unillustrated fuel pump to an unillustrated fuel tank, so that the pressure of fuel to be injected from the injector 9 can be controlled.

To control the engine system, various sensors are arranged. First, as is shown in FIG. 2, a portion where intake air flowed past the air cleaner 7 flows into the intake passage 3 is provided with an air flow sensor (inducted air quantity sensor) 17 for detecting the quantity of the inducted air from Karman vortex information, an intake air temperature sensor 18, and an atmospheric pressure sensor 19.

At the position of arrangement of the throttle valve 8 in the intake passage 3, there are arranged a throttle position sensor 20 in the form of a potentiometer for detecting the position of the throttle valve 8 as well as an idling switch 21.

On the side of the exhaust passage 4, on the other hand, a linear oxygen concentration sensor (hereinafter referred to simply as the "linear $O_2$ sensor") 22 for linearly detecting the concentration of oxygen ($O_2$ concentration) in the exhaust gas on a side of lean air/fuel ratios is disposed on an upstream side of the three-way catalyst 10. Other sensors include a coolant temperature sensor 23 for detecting the temperature of coolant of the engine 1, a crank angle sensor 24 (see FIG. 3) for detecting a crank angle (which can also function as a speed sensor for detecting an engine speed Ne), a vehicle speed sensor 30 as means for directly detecting the state of a vehicle speed, etc.

Detection signals from these sensors and switch are inputted to ECU 25 as shown in FIG. 3.

The hardware construction of ECU 25 can be illustrated as shown in FIG. 3. ECU 25 is constructed as a computer which is provided as a principal component thereof with CPU (processor) 26. To CPU 26, detection signals from the intake air temperature sensor 18, the atmospheric pressure sensor 19, the throttle position sensor 20, the linear $O_2$ sensor 22, the coolant temperature sensor 23 and the like are inputted via an input interface 28 and an A/D converter 29.

Directly inputted through an input interface 35 to CPU 26 are detection signals from the air flow sensor 17, the idling switch 21, the crank angle sensor 24, the vehicle speed sensor 30 and the like.

Through a bus line, CPU 26 also exchanges data with ROM (memory means) 36, in which various data are stored along with program data and fixed value data, and also with RAM 37 which is updated, that is, successively rewritten.

As a result of computation by CPU 26, ECU 25 outputs signals for controlling the state of operation of the engine 1, for example, various control signals such as a fuel injection control signal, an ignition timing control signal, an ISC control signal, a bypass air control signal and an EGR control signal.

Here, the fuel injection control (air/fuel ratio control) signal is outputted from CPU 26 to an injector solenoid 9*a* (precisely, a transistor for the injector solenoid 9*a*), which is arranged to drive the injector 9, via an injector solenoid driver 39. The ignition timing control signal is outputted from CPU 26 to a power transistor 41 via an ignition coil driver 40, so that a current is supplied from the power transistor 41 via an ignition coil 42 to a distributor 43 to make individual spark plugs 16 successively produce sparks.

The ISC control signal is outputted from CPU 26 to the stepper motor 12*b* via the motor driver 44, while the bypass air control signal is outputted from CPU 26 to the solenoid 142*a* of the air-bypass-valve-controlling electromagnetic valve 142 via an air bypass valve driver 45.

Further, the EGR control signal is outputted from CPU 26 to the solenoid 83*a* of the EGR-valve-controlling electromagnetic valve 83 via the EGR driver 46.

Figure 1:
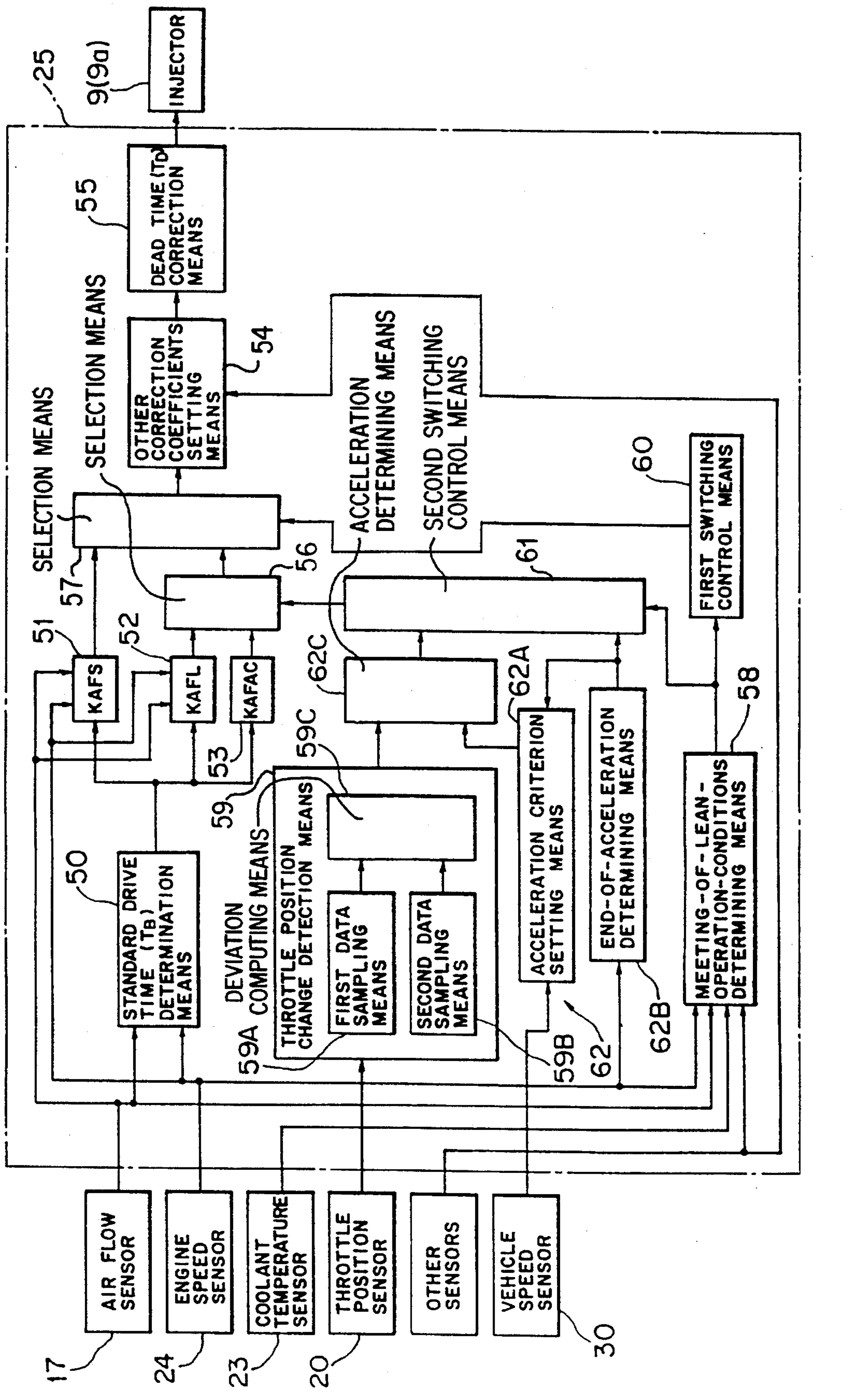
FIG. 1 is a control block diagram of a control system according to one embodiment of the present invention for a lean-burn internal combustion engine.

Now paying attention to the fuel injection control (air/fuel ratio control), ECU 25 is provided, as shown in FIG. 1, with functions of standard drive time determination means 50, air/fuel ratio correction coefficient setting means 51, lean air/fuel ratio coefficient setting means 52, accelerated stoichiometric-burn operation air/fuel ratio coefficient setting means 53, other correction coefficients setting means 54, dead time correction means 55 and selection means 56,57 for the fuel injection control (injector drive time control). Also provided are functions of meeting-of-lean-burn-operation-conditions determining means 58, throttle position change detection means (load change parameter detection means) 59, first switching control means 60 and second switching control means 61 as well as functions of acceleration determining unit 62 constructed of functions of acceleration criterion setting means 62A, end-of-acceleration determining means 62B, acceleration determining means 62C and the throttle position change detection means 59.

Here, the standard drive time determination means 50 serves to determine a standard drive time $T_B$ for the injector 9. Accordingly, the standard drive time determination means 50 obtains information on the amount of air inducted per revolution of the engine (hereinafter called "A/N information") on the basis of information on an inducted air quantity A from the air flow sensor 17 and information on an engine speed Ne from the crank angle sensor (engine speed sensor)

24 and then determines the standard drive time $T_B$ on the basis of the A/N information.

The air/fuel ratio coefficient setting means 51 is to set an air/fuel ratio coefficient KAFS to change the air/fuel ratio to a richer value or a stoichiometric value according to the state of an operation.

The lean air/fuel ratio coefficient setting means 52 is to set an air/fuel ratio coefficient KAFL to make the air/fuel ratio leaner, and the accelerated stoichiometric operation air/fuel ratio coefficient setting means 53 is to set an accelerated stoichiometric operation air/fuel ratio coefficient KAFAC to set the air/fuel ratio at a stoichiometric ratio when the vehicle is determined to be in acceleration in the course of a lean-burn operation.

The other correction coefficients setting means 54 is to set correction coefficients K in accordance with an engine coolant temperature, an inducted air temperature, an atmospheric pressure, etc. Further, the dead time correction means 55 is to set a dead time $T_D$ so that the drive time can be corrected depending on the voltage of a battery.

The selection means 56 serves to select either the air/fuel ratio coefficient KAFL from the lean air/fuel ratio coefficient setting means 52 or the accelerated stoichiometric-burn operation air/fuel ratio coefficient KAFAC from the accelerated stoichiometric-burn operation air/fuel ratio coefficient setting means 53. The selection means 57, on the other hand, acts to select either the air/fuel ratio correction coefficient KAFS from the air/fuel ratio coefficient setting means 52 or the air/fuel ratio coefficient KAFL or KAFAC selected by the selection means 56.

The meeting-of-lean-burn-operation-conditions determining means 58 is to determine whether conditions permitting a lean-burn operation have been met.

The throttle position change detection means 59 differentiates detection signals from the throttle position sensor 20 so that a change (also called "deviation") in the position of the throttle valve 8, said change being a parameter correlated to a change in the state of load on the engine 1, is detected.

Described specifically, this throttle position change detection means 59 is constructed of first data sampling means 59A, second data sampling means 59B and deviation computing means 59C.

At a first sampling interval τ preset at a long period on the basis of count information from a timer (not illustrated), the first data sampling means 59A reads detection signals (TPS values) of throttle position data (load-correlated parameter data) from the throttle position sensor 20 and outputs the values to the deviation computing means 59C.

At a second sampling interval β preset at a short period on the basis of count information from a timer (not illustrated), the second data sampling means 59B reads detection signals (TPS values) of throttle position data (load-correlated parameter data) from the throttle position sensor 20 and outputs the values to the deviation computing means 59C.

Although the two sampling intervals τ, βare used, the second sampling interval β is set shorter compared with the first sampling interval τ (>β). For example, the first sampling interval τ is set at several hundreds msec or longer whereas the second sampling interval β is set at several tens msec.

Namely, the first sampling interval τ is set sufficiently long (for example, several hundreds msec or longer) to ensure detection of an acceleration even if the acceleration is gradual. Conversely, the second sampling interval β is set significantly short (for example, several tens msec) so that no troublesome delay takes place in the responsibility of control at the time of a sudden acceleration.

The deviation computing means 59C computes the deviation between a throttle position datum (load-correlated parameter datum) T0 obtained by the first data sampling means 59A and another throttle position datum (load-correlated parameter datum) T obtained by the second data sampling means 59B and outputs the deviation as a throttle position deviation (load-change-correlated parameter).

Accordingly, after the throttle position datum T0 has been obtained from the first data sampling means 59A, throttle position deviations ΔTPS (T=T−T0) are computed at the sampling intervals β from the datum T0 and throttle position data T obtained at the sampling intervals β from the second data sampling means 59B.

The first switching control means 60 acts to control switching of the selection means 57 on the basis of the results of a determination by the meeting-of-lean-burn-operation-conditions determining means 58.

The second switching control means 61 serves to control switching of the selection means 56. Described more specifically, the second switching control means 61 controls the selection means 56 in such a way that when an accelerated operation is performed in the course of a lean-burn operation, the selection means 56 selects the accelerated stoichiometric-burn operation air/fuel ratio coefficient KAFAC from the accelerated stoichiometric-burn operation air/fuel ratio correction coefficient setting means 53 but upon ending of the accelerated operation, the selection means 56 then selects the air/fuel ratio coefficient KAFL from the lean air/fuel ratio coefficient setting means 52 and also that when an operation other than an accelerated operation is performed in the course of a lean-burn operation, the selection means 56 selects the air/fuel ratio coefficient KAFL from the lean air/fuel ratio coefficient setting means 52.

A description will now be made of the acceleration determining means 62C and the end-of-acceleration determining means 62B, both provided for the control of the second switching control means 61, and also of the acceleration criterion setting means 62A arranged along with the above-described throttle position change detection means 59 for a determination by the acceleration determining means 62C.

At the acceleration criterion setting means 62A, a value (normal value) α2 is usually set at a criterion α but under certain specific conditions, namely, only for a predetermined period immediately after the operation has changed from an accelerated stoichiometric operation to a lean-burn operation, the criterion α is set at a value α1 greater than the value α2 (α1>α2). Specifically, when subsequent to receipt of detected information from the vehicle speed sensor 30 and information from the end-of-acceleration determining means 62B, a detected vehicle speed Vs has been determined to be in a high-speed range faster than a threshold Vs1 and an acceleration is determined to have ended, the relatively large value α1 (α1>α2) is set as the criterion α only for the predetermined period from the time of the above determinations on the basis of the timer (not illustrated).

The end-of-acceleration determining means 62B receives information from the engine sped sensor 24 and compares an increase in the engine speed Ne with a preset threshold ΔNe1. When the increase in the engine speed has subsided, the acceleration is determined to have ended so that information indicating the end of the acceleration is outputted to the second switching control means 61 for switching the operation to a lean-burn operation and also to the acceleration criterion setting means 62A for changing the criterion.

At the acceleration determining means 62C. the vehicle is determined to be in acceleration when the position deviation $\Delta$TPS of the throttle valve 8 has been found greater than the criterion $\alpha$ from the detected information from the throttle position change detection means 59 and preset information from the acceleration criterion setting means 62A. Information indicating this is then outputted to the second switching control means 61.

As is appreciated from the above description, the second switching control means 61 controls the selection means 56 to select the accelerated stoichiometric-burn operation air/fuel ratio coefficient KAFAC when the engine has been determined to be in a lean-burn operation on the basis of information from the meeting-of-lean-burn-operation-conditions determining means 58 and an accelerated operation has also been determined to be under way on the basis of information from the acceleration determining means 62C. When the acceleration is then determined to have ended on the basis of information from the end-of-acceleration determining means 62B, the second switching control means 61 controls the selection means 56 to select the air-fuel ratio coefficient KAFL from the lean air/fuel ratio coefficient setting means 52 again.

A fuel injection time $TiN_J$ is therefore set at one of $T_B \times KAFS \times K + T_D$, $T_B \times KAFL \times K + T_D$ and $T_B \times KAFAC \times K + T_D$ and the fuel is then injected for the time $T_{INJ}$.

ECU 25 therefore has the function of air/fuel ratio control means that during a lean-burn operation, ECU 25 compares output information from the throttle position change detection means 59 with the acceleration criterion $\alpha$ set by the acceleration criterion setting means 62A and if the output information is greater than the acceleration criterion $\alpha$, determines an accelerated operation and changes the mixing ratio of fuel to air, which are to be fed to the engine 1, to a stoichiometric ratio (or a rich ratio).

Fuel injection control (air/fuel ratio control) in a lean-burn engine will next be described using the flow charts shown in FIGS. 4 and 5, respectively.

Figure 4:
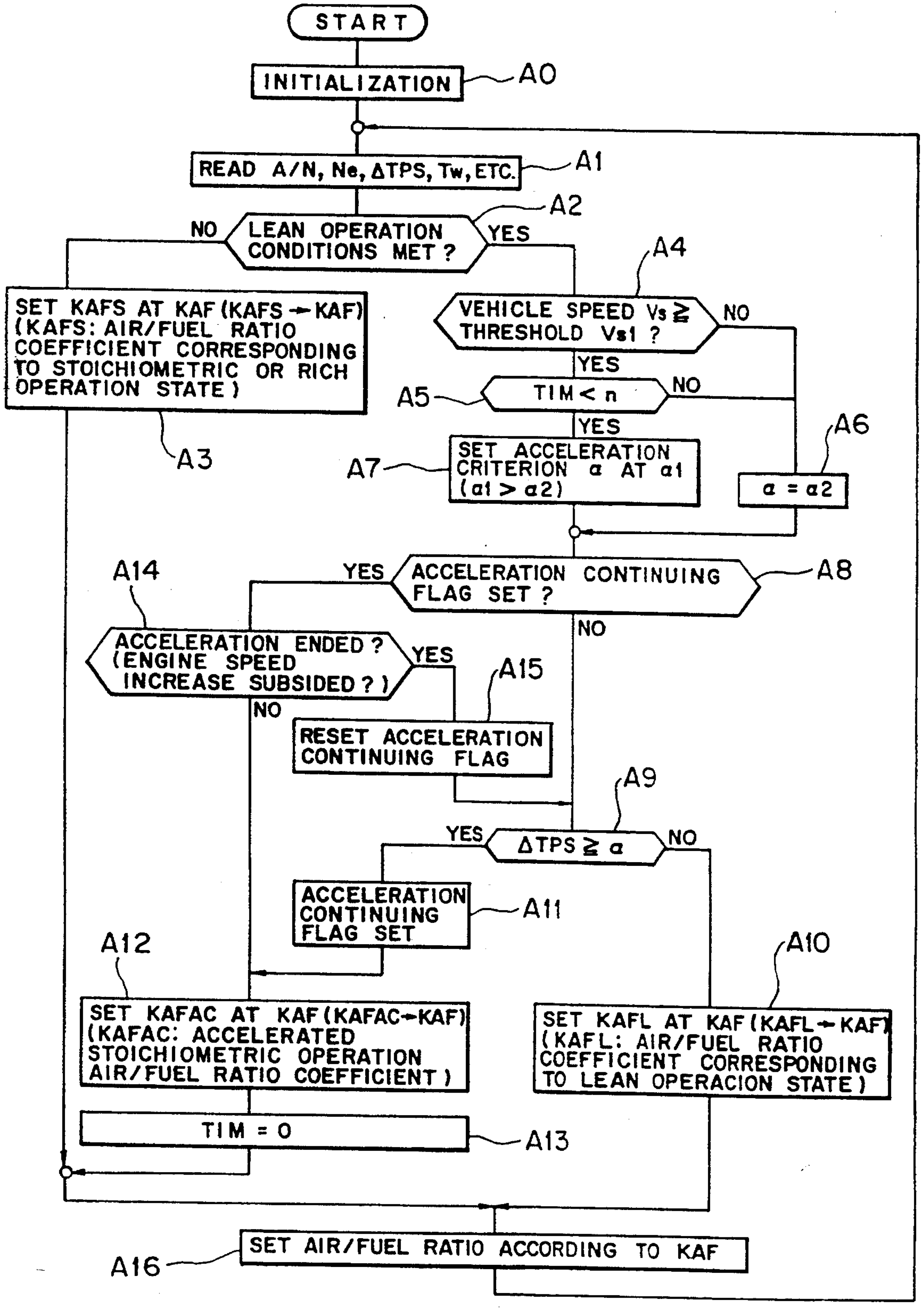
FIG. 4 is a flow chart explaining an operation of the control system.
Figure 5:
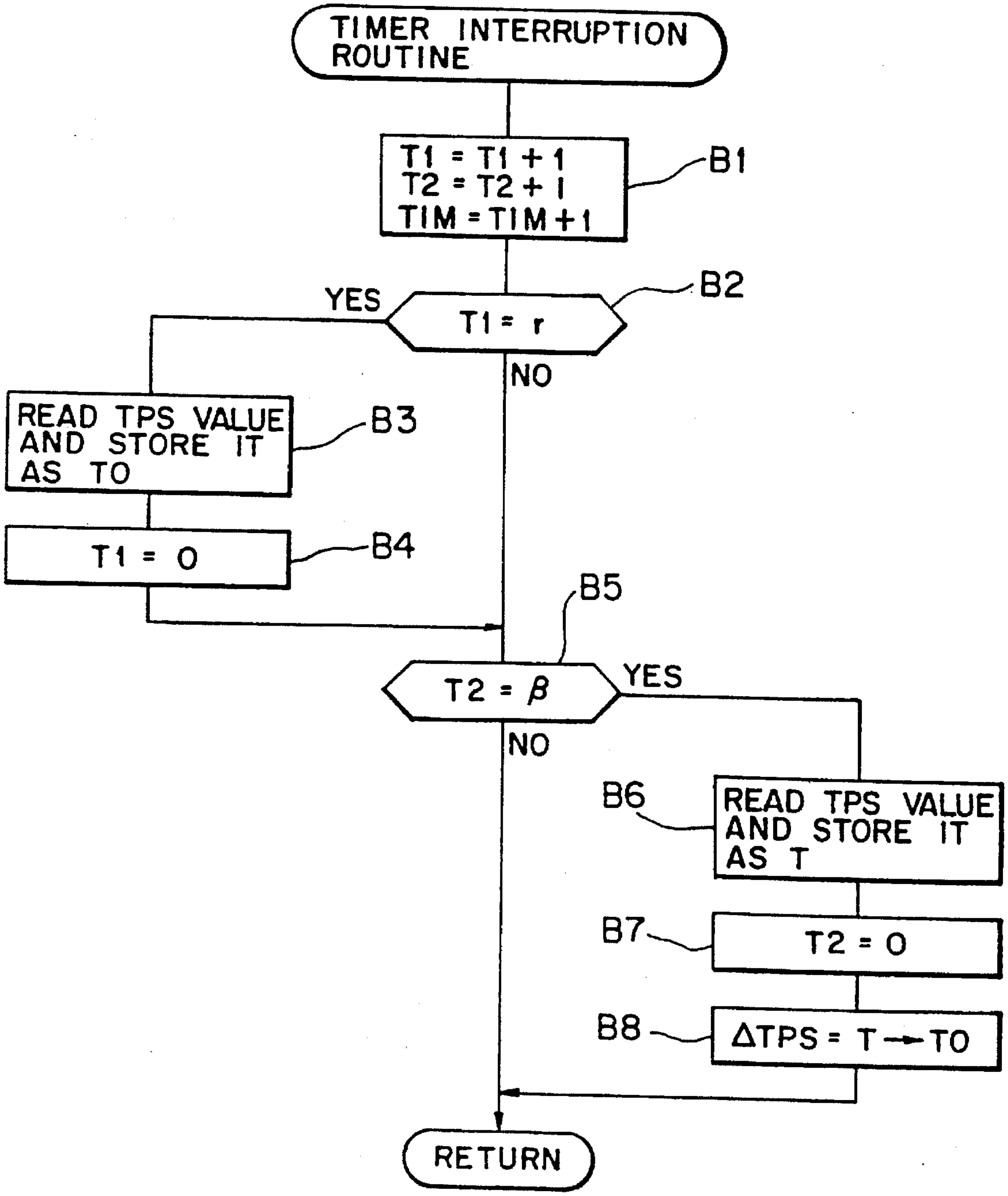
FIG. 5 is a flow chart for describing the computation of a decision parameter useful in the control by the control system.

Before describing a main routine shown in FIG. 4, a description will first be made of a timer interruption routine for setting or computing a determination parameter for use in the main routine (FIG. 5).

According to the timer interruption routine illustrated in FIG. 5, a long sampling period timer count $T_1$, a short sampling period timer count $T_2$ and a switching timer count TIM are incremented in step B1. When the long sampling period timer count $T_1$ is found to have reached the preset long period (the first sampling interval) $\tau$as a result of a determination in step B2, the routine advances to step B3 and a detection signal (TPS value) of a throttle opening datum (load-correlated parameter) from the throttle position sensor 20 is read by the first data sampling means 59A. The TPS value is stored as a first datum T0. In step B4, the timer count $T_1$ is reset to 0 and the routine then advances to step B5.

The operations in steps B3 and B4 are not performed unless the long sampling period timer count $T_1$ has reached the sampling interval $\tau$. The routine then advances to step B5. If the count T2 of the short period time is determined to have reached the preset short period (second sampling interval) $\beta$ in step B5, the routine advances to step B6 and by the second data sampling means 59B, a detection signal (TPS value) of the throttle position datum (load-correlated parameter datum) from the throttle position sensor 20 is read and then stored as a second datum T. The timer count $T_2$ is reset to 0 in step B7. The deviation (throttle valve position deviation) $\Delta$TPS (= T−T0) between the first datum T0 and the second datum T is then calculated in step B8.

The operations in steps B6 to B8 are not performed unless the short sampling period timer count $T_2$ has reached the second sampling interval $\beta$.

In the above-described manner, the switching timer count TIM is incremented unless reset to 0, and $\Delta$TPS is updated at short intervals (the second sampling intervals) $\beta$.

A description will now be made of the main routine. As is illustrated in FIG. 4, initialization is first performed in step A0 upon initiation of the routine. In step A1 onwards, a setting operation of the air/fuel ratio is performed periodically.

In step A1, an A/N (the quantity of air inducted per revolution of the engine), an engine speed Ne, a coolant temperature $T_W$ and the like are read. In step A2, it is determined whether conditions for a lean-burn operation have been met. Since the conditions for the lean-burn operation have not been met at the beginning, the air/fuel ratio coefficient KAFS corresponding to a stoichiometric-burn or rich-burn operation state is set at KAF in step A3 and an air/fuel ratio is set according to KAF in step A16.

Accordingly, fuel injection control is performed to set the air/fuel ratio at a stoichiometric value or a rich value in accordance with the state of operation of the engine.

Next assume that in step A2, the conditions for the lean-burn operation are determined to have been met. The routine then advances along the YES route to step A4, where it is determined whether a vehicle speed Vs is not lower than the threshold Vsl. If the vehicle speed Vs is not lower than the threshold Vsl (in other words, is high), the routine then advances to step A5 and a determination is made as to whether the switching timer count TIM is not greater than a threshold $\eta$. Usually, the vehicle speed Vs is not equal to or greater than the threshold Vsl or TIM is not equal to or smaller than the threshold $\eta$. The routine therefore advances to step A6 so that the acceleration criterion $\alpha$ is set at the normal value $\alpha 2$. Incidentally, the acceleration criterion is initially set at this normal value $\alpha 2$ in step A0.

If the vehicle speed Vs is equal to or greater than the threshold value Vs1 and TIM is equal to or smaller than the threshold $\eta$, on the other hand, the routine advances to step A7 so that the acceleration criterion $\alpha$ is set at the greater value $\alpha 1$ ($\alpha 1 > \alpha 2$).

TIM however continuously increases insofar as a below-described acceleration continuing flag (a flag for making the selection means 56 select an accelerated stoichiometric-burn operation air/fuel ratio) has been set and TIM is not reset to 0 in step A13. Therefore the routine does not usually advance to step A7 unless an accelerated stoichiometric-burn operation is performed beforehand.

When the acceleration criterion e has been set as described above, it is then determined in step A8 whether the acceleration continuing flag has been set. Since the acceleration continuing flag has not been set in the beginning, the routine 9 advances to step A9 so that it is determined whether a throttle valve position deviation $\Delta$TPS obtained at each short interval (second sampling interval) $\beta$ is not smaller than the acceleration criterion $\alpha$. Unless the throttle valve position deviation $\Delta$TPS is equal to or greater than the acceleration criterion $\alpha$, no accelerated stoichiometric-burn operation is needed so that the routine advances to step A10. The air/fuel ratio coefficient KAFL corresponding to the state of a lean-burn operation is then set at KAF and in step A16, an air/fuel ratio is set according to KAF.

As a consequence, fuel injection control is performed in accordance with the state of the lean-burn operation.

If the throttle valve position deviation $\Delta$TPS is equal to or greater than the acceleration criterion e, on the other hand, the routine advances from step A9 to step A11 so that an acceleration continuing flag is set. In step A12, the accelerated stoichiometric-burn operation air/fuel ratio coefficient KAFAC is set at KAF. TIM is reset to 0 in step A13 and an air/fuel ratio is then set in accordance with KAF in step A16.

If the accelerator pedal is depressed during a lean-burn operation, fuel injection control is therefore performed to set a stoichiometric or rich air/fuel ratio.

When the acceleration continuing flag has been set as described above, the routine advances to step A8 via steps A4 to A7 as long as the conditions for the lean-burn operation are met. Pursuant to the determination in step A8, the routine then advances to step A14.

Especially when the vehicle speed Vs is a high speed equal to or greater than the threshold Vs1, the routine advances step steps A4, A5 to step A7 as long as the acceleration continuing flag is not reset. The acceleration criterion α is hence set at the relative large value α1 (α1>α2).

In step A14, it is determined by the end-of-acceleration determining means 62B whether the acceleration has ended. If the acceleration has not ended, the routine advances to step A12 and as described above, the accelerated stoichiometric-burn operation air/fuel ratio coefficient KAFAC is set at KAF and the air/fuel ratio is set. Fuel injection control is therefore performed to make the air/fuel ratio stoichiometric or rich.

Upon ending of the acceleration, the routine then advances from step A14 to step A15 so that the acceleration continuing flag is reset. The routine then advances to step A9, where it is determined whether the throttle valve position deviation ΔTPS is not smaller than the preset acceleration criterion α. Since the acceleration criterion α usually turns to the relatively large value α1 shortly after the acceleration continuing flag has been reset, ΔTPS<α unless the throttle valve position deviation ΔTPS becomes extremely large. The routine then advances to step A10. Next, the air/fuel ratio coefficient KAFL corresponding to the state of a lean-burn operation is set at KAF and in step A16, an air/fuel ratio is set according to KAF.

As a consequence, fuel injection control is performed in accordance with the state of the lean-burn operation.

When this route is taken, TIM is not reset to 0 so that TIM increases. When a time X has elapsed, TIM≦X is no longer met. The routine therefore advances from step A5 to step A6, whereby the acceleration criterion α is changed back to the normal value α2. Needless to say, even if the time X has not elapsed yet, the routine advances to step A6 pursuant to a determination in step A4 when the vehicle speed Vs becomes smaller than the threshold Vs1. The acceleration criterion α is therefore set back to the normal value A2.

After that, a similar processing is repeated when an operation continues in a lean-burn state.

Since ΔTPS≧α is met if the throttle valve position deviation ΔTPS becomes greater to a normal level or so, an accelerated stoichiometric operation is performed as needed upon acceleration. In other words, the accelerated stoichiometric-burn operation air/fuel; ratio coefficient KAFAC is changed to KAF. Based on KAF, an air/fuel ratio is set.

Figure 6:
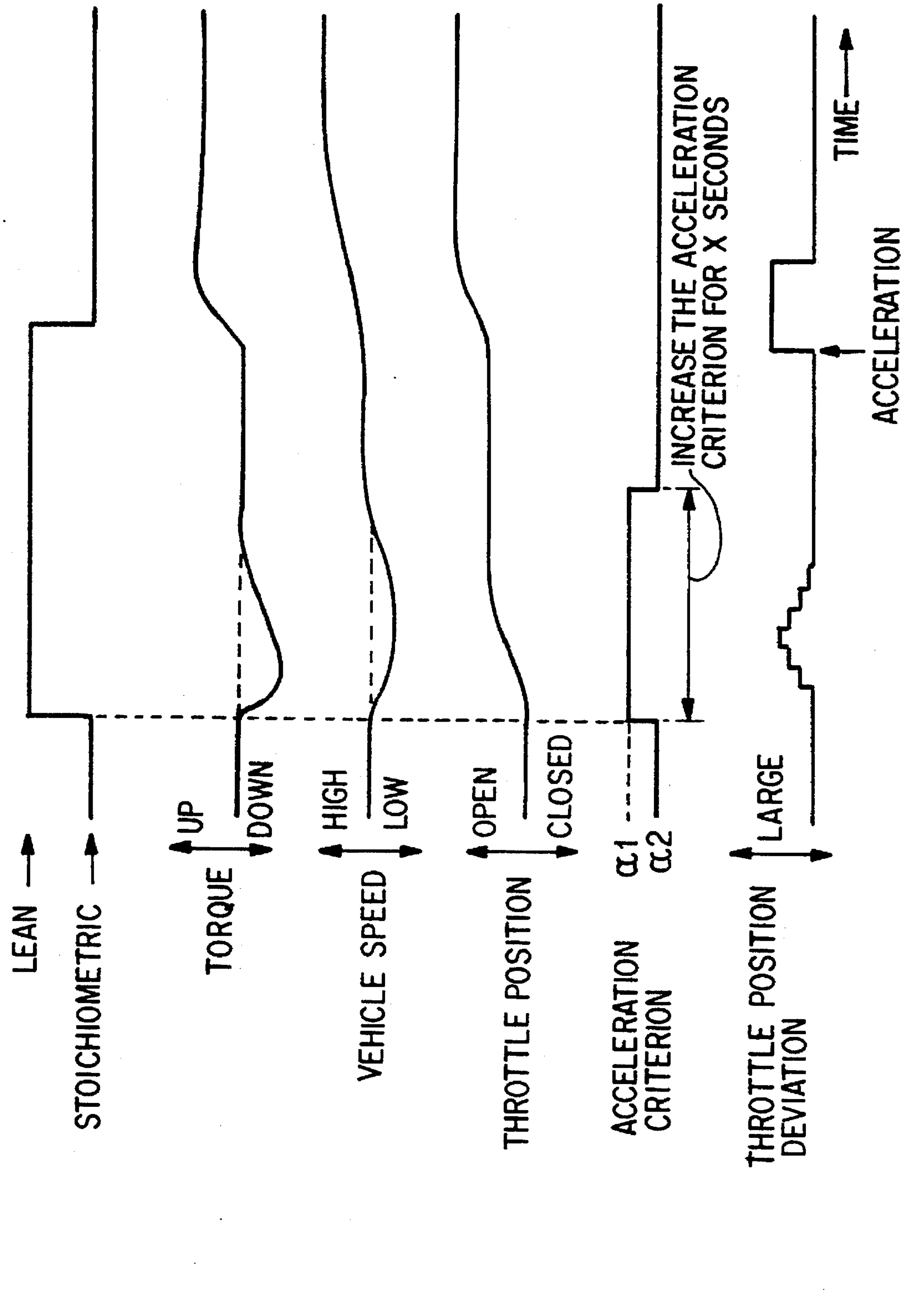
FIG. 6 is a time chart for describing the advantages of the present invention.

Since the control system operates as described above, fuel injection control is performed as will be described next when an accelerated stoichiometric-burn operation corresponding to an acceleration is performed in the course of a lean-burn operation and as shown by way of example in FIG. 6, an operation is then performed to achieve an acceleration again subsequent to ending of the former acceleration.

In an accelerated state, first, an accelerated stoichiometric-burn operation air/fuel ratio has been set and an accelerated stoichiometric-burn operation is under way. When the acceleration has ended, a leanburn operation air/fuel ratio is set and the operation is switched to a lean-burn operation.

If the vehicle is operated at a high speed immediately after the above switching, the acceleration criterion α is set at the large value (α1) for a predetermined time (time: X seconds, for example). Even if as shown by a dashed line in the diagram, the driver depresses the accelerator pedal and increases the throttle valve position deviation ΔTPS with a view to coping with a drop in the vehicle speed due to occurrence of a substantial torque down subsequent to switching to a lean-burn operation, the throttle valve position deviation ΔTPS so increased is not determined as an acceleration so that the lean-burn operation is maintained. Needless to say, if the accelerator pedal is depressed to actually achieve a further acceleration instead of such a depression of the accelerator pedal as maintaining the vehicle speed subsequent to switching to the lean-burn operation, the driver usually conducts a substantial depression of the accelerator pedal so that the throttle valve position deviation ΔTPS becomes extremely large and is hence determined as an acceleration. The air/fuel ratio is therefore switched again from a lean value to an accelerated stoichiometric value.

When the predetermined period (time: X seconds) has elapsed, the acceleration criterion α is again set back to the normal value α2 as shown in FIG. 6. After this, determination of an acceleration is therefore performed as usual on the basis of the throttle valve position deviation ΔTPS. When an acceleration is determined (i.e., ΔTPS≧α(=α2), an accelerated stoichimetric-burn operation is performed to avoid deterioration of exhaust gas and also to retain acceleration performance.

In the above control system, the acceleration determining unit 62 is provided with two sampling intervals τ, β, one being large and the other small, to perform detection by the throttle position change detection means 59. At the deviation computing means 59C, the deviation (T–T0) between a datum T0 obtained at a large sampling interval τand a datum T obtained at a small sampling interval β is used as the throttle position deviation ΔTPS. Corresponding to each change in the throttle position as shown under (A) in FIG. 7, for example, the throttle position deviation ΔTPS is determined as indicated under (B) in FIG. 7. This throttle position deviation ΔTPS is then compared with the acceleration criterion α to determine an acceleration. According to determination of an acceleration at conventional long sampling intervals τ, the acceleration is determined as illustrated under (C) in FIG. 7.

Figures 7A, 7B, 7C:
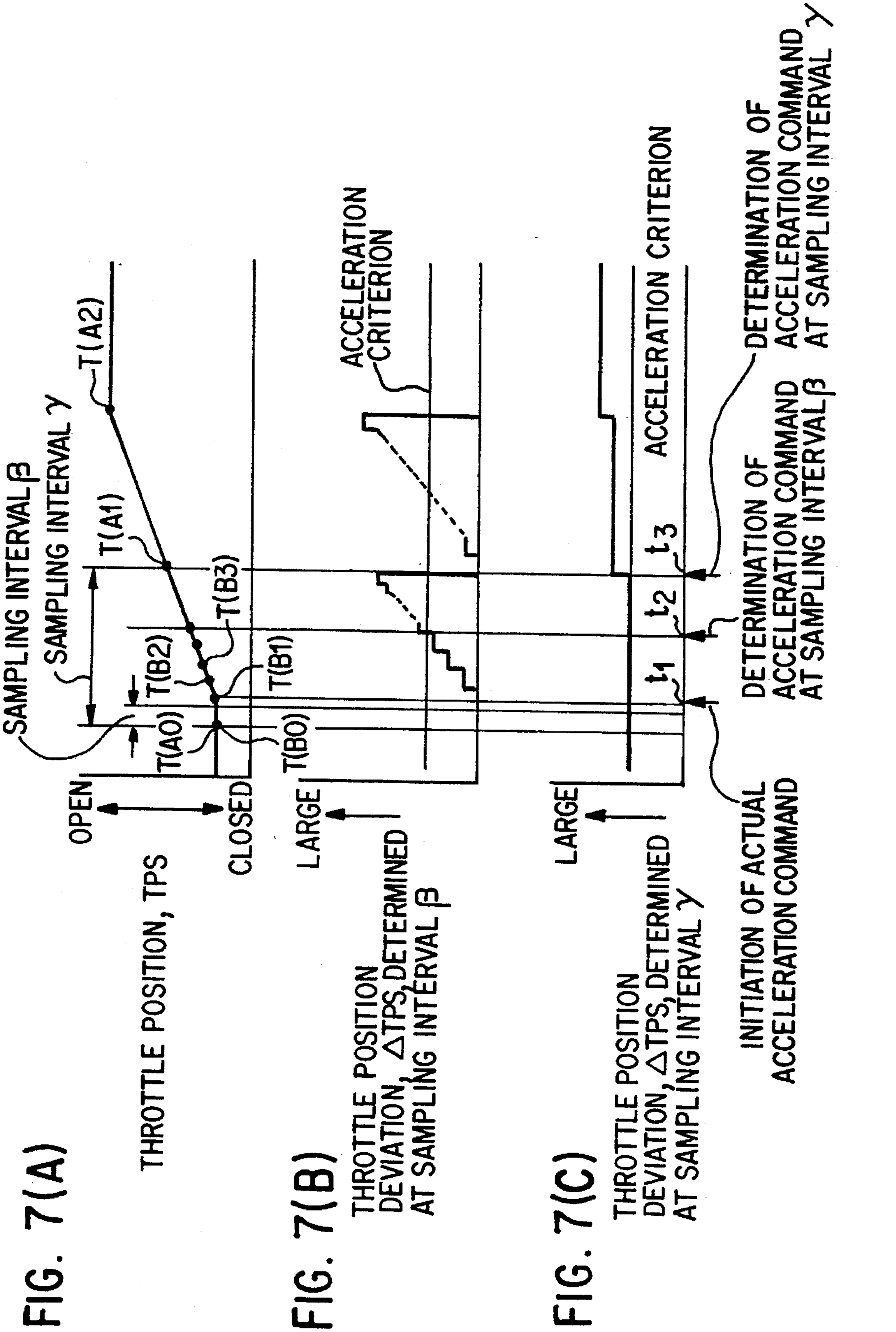
FIG. 7 (A)–(C) are time charts for describing the advantages of the present invention.
Figure 8:
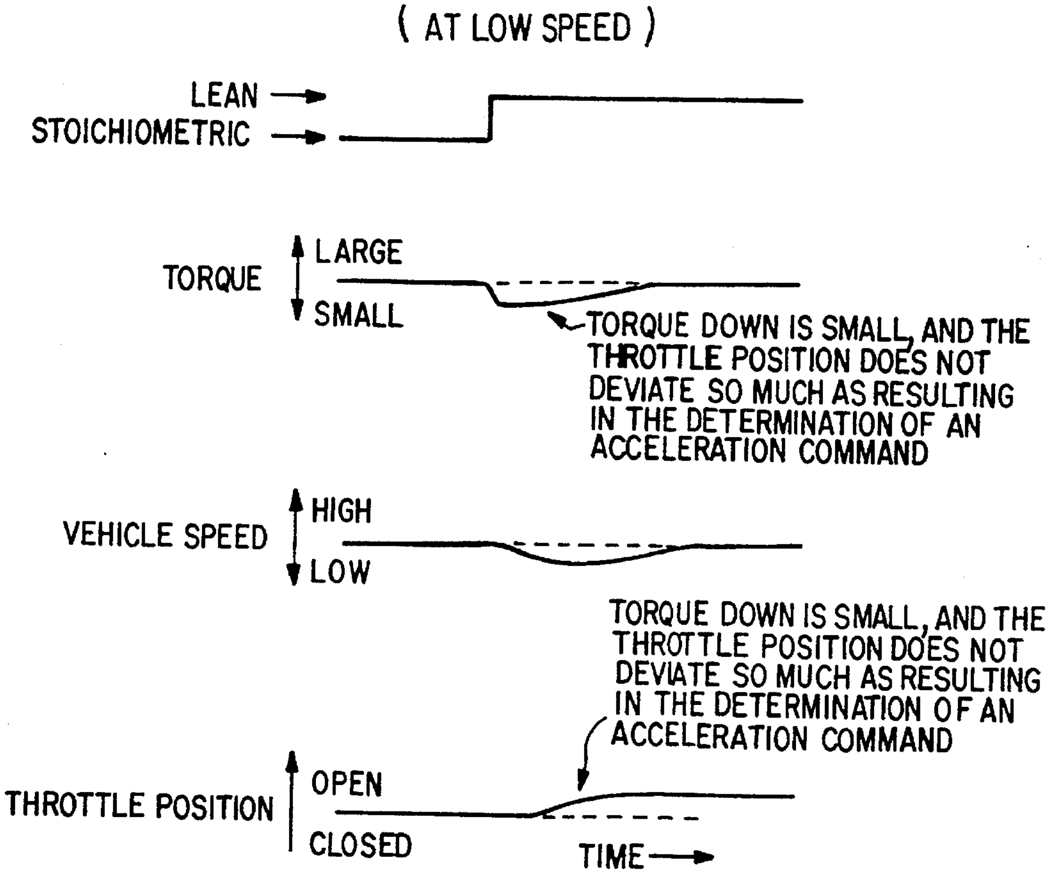
FIG. 8 is a diagram showing illustrative control by a conventional control system for a lean-burn internal combustion engine.
Figure 9:
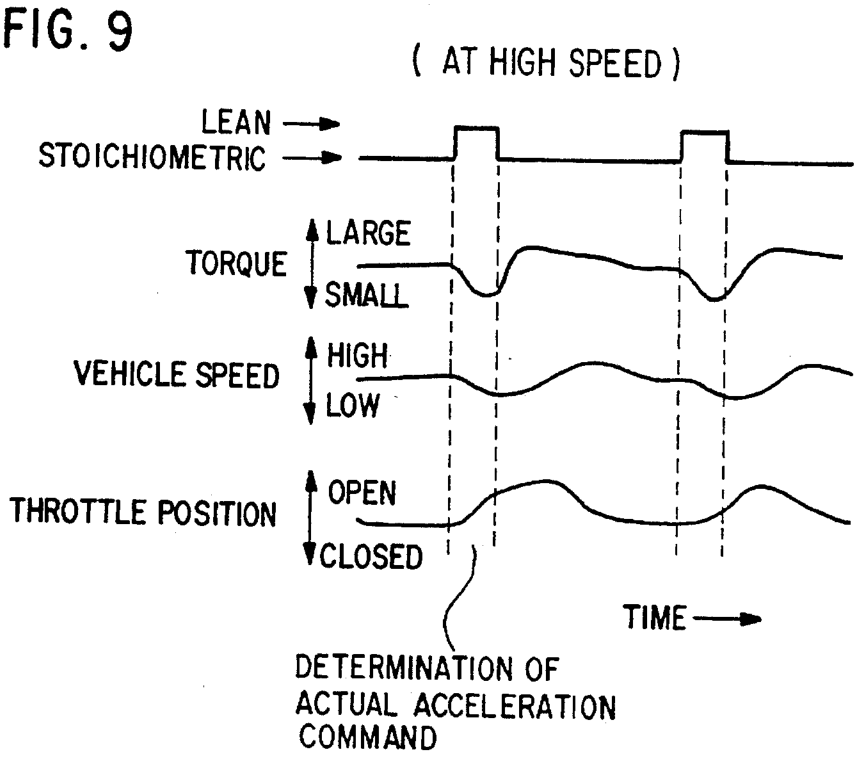
FIG. 9 diagrammatically shows an example of control by the control system in the conventional lean-burn internal combustion engine and illustrates the problem overcome by the present invention.

According to the determination of an acceleration at conventional long sampling intervals τ, the throttle position deviation ΔTPS is obtained to determine the acceleration as shown under (C) in FIG. 7 while sampling throttle position data T(A0), (A1), (A2), . . . at intervals τ. Assume that the acceleration is initiated at time point t1 in this case. Because determination is effected only at long sampling intervals τ after the initiation of the acceleration, the acceleration is not determined until time point t3 at the earliest in the case of the example illustrated in FIG. 7.

According to the control system of the present invention, on the other hand, the throttle position deviation ΔTPS is obtained to determine the acceleration as illustrated under (B) in FIG. 7 while sampling throttle position data T(A0), (A1), (A2), . . . at intervals $\tau$ and also throttle position data T(B0), (B1), (B2), . . . at intervals $\beta$. When the throttle position changes as shown under (A) in FIG. 7, the throttle position deviation $\Delta$TPS gradually increases and at time point t2 where the throttle position deviation $\Delta$TPS exceeds the acceleration criterion $\alpha$, the acceleration is determined.

When a relatively sudden acceleration is performed, the throttle position deviation $\Delta$TPS therefore exceeds the acceleration criterion $\alpha$ and the acceleration is determined, without need for going through many sampling intervals $\beta$. Even during a gradual acceleration, any sudden acceleration can be determined in a relatively short time. With respect to a most sudden acceleration, the throttle position deviation $\Delta$TPS is obtained at the unit sampling interval $\beta$ and the acceleration can hence be determined on the basis of the throttle position deviation $\Delta$TPS so obtained. An acceleration can therefore be determined as promptly as possible.

When a gradual acceleration is performed, it is necessary to go through many sampling intervals $\beta$ until the throttle position deviation $\Delta$TPS exceeds the acceleration criterion $\alpha$ to permit determination of the acceleration. With respect to a most gradual acceleration, the throttle position deviation $\Delta$TPS is obtained at the unit sampling interval $\tau$ and the acceleration can hence be determined on the basis of the throttle position deviation $\Delta$TPS so obtained. Even at the time of a gradual acceleration, the acceleration can be determined surely.

As is appreciated from the foregoing, the control system according to the present invention can properly perform determination of an acceleration for a wide range of accelerations.

Incidentally, at the time of a sudden acceleration, the acceleration can be determined from data sampled at short intervals as in the conventional art. It is however unnecessary to dare to deal with a gradual acceleration and a sudden acceleration separately as described above.

In place of the three-way catalyst 10, an oxidation catalyst may be arranged.

Further, instead of using one capable of detecting changes in the throttle position as the load change parameter detection means, it is possible to use means for detecting changes in the intake passage pressure or in the quantity of inducted air.

In the above embodiment, the control system is constructed to temporarily increase the acceleration criterion only when the vehicle speed Vs is a high speed equal to or greater than the threshold Vs1 as shown in step A4 of the flow chart of FIG. 4. The acceleration criterion may however be switched on the basis of a gear position of a transmission, said gear position permitting indirect detection of the state of a vehicle speed, in addition to a vehicle speed value which is a direct detection value of the state of the vehicle speed.

This modification can be constructed by disposing gear ratio detection means for detecting a gear position of a transmission arranged between the engine an driven wheels so that a vehicle speed is determined only when the gear position detected by the gear ratio detection means is a high gear ratio but the acceleration criterion is temporarily increased when the gear position so detected is a high gear ratio and the vehicle speed is a high speed. In this case, the gear position of the transmission is read in step A1 of the flow chart in FIG. 4. In the course along which the routine advances from step A2 to step A4, a step is added to determine whether the gear position is, for example, at the position of a high gear ratio such as an over top or a top gear.

If the gear position is at the high gear ratio, the routine advances to step A4. Further, if the vehicle speed is high, the routine advances to steps A5 and A7 to temporarily increase the acceleration criterion. If the gear position is not at a high gear ratio, the routine advances to step A6 to set the acceleration criterion at a normal value.

The acceleration criterion may be switched based on the gear position of the transmission instead of the vehicle speed value.

Described specifically, this modification can be constructed by arranging the above-described speed stage detection means instead of the vehicle speed detection means so that the acceleration criterion can be increased temporarily only when the gear position of the transmission as detected by the speed stage detection means is a high gear ratio. This modification can also be carried out by substantially following the flow chart of FIG. 4. In step A1, the gear position of the transmission is read. In step A4, it is determined whether the gear position is at the position of a high gear ratio such as an over top or a top gear. If the gear position is at the position of the high gear ratio, the routine advances to step A5 so that the acceleration criterion is temporarily increased in steps A5, A7. If the gear position is not at a high gear ratio, the routine advances to step A6 to set the acceleration criterion to the normal value.

When the acceleration criterion is changed over depending on the gear position as described above, it is possible to imagine occurrence of such a situation that upon acceleration of a vehicle or the like, for example, the vehicle speed may reach such a high speed as corresponding to a high gear ratio although the gear position is not in the high gear ratio.

According to the present invention, however, the acceleration criterion is temporarily increased to enlarge a lean-burn operation range shortly after an acceleration has ended and the operation has been switched to a lean-burn operation. It is therefore sufficient if the gear position is at a high gear ratio when an acceleration has ended.

Assume that the gear position is at a high gear ratio and the vehicle speed is high. If the driver wishes to maintain high-speed running subsequent to ending of an acceleration of the vehicle, he usually shifts the gear position to a still higher gear ratio. Accordingly it is also possible to switch the acceleration criterion on the basis of the gear position in substantially the same manner as the above-described switching of the acceleration criterion by the determination of the vehicle speed.

What is claimed is:

1. A control system for a lean-burn internal combustion engine mounted on a vehicle to perform a lean-burn operation at an air/fuel ratio leaner than a stoichiometric air/fuel ratio under predetermined operation conditions, comprising:

load change parameter detection means for detecting a parameter correlated to a change in load on said internal combustion engine;

vehicle speed state detection means for detecting the state of running speed of said vehicle;

means for setting an acceleration criterion;

acceleration determining means for comparing output information from said load change parameter detection means with said acceleration criterion set by said acceleration criterion setting means and when said output information is greater than said acceleration criterion, determining that said internal combustion engine is in an accelerated operation;

end-of-acceleration determining means for determining an end of said accelerated operation; and air/fuel ratio control means for controlling the mixing ratio of fuel to air, which are to be fed to said internal combustion engine, to said stoichiometric air/fuel ratio or said richer air/fuel ratio when said internal combustion engine has been determined to be in said accelerated operation by said acceleration determining means in a lean-burn operation, and then controlling said air/fuel mixing ratio back to said leaner air/fuel ratio when said accelerated operation is determined to have ended by said end-of-acceleration determining means;

wherein when the state of running speed of vehicle detected by said vehicle speed state detection means is in a high speed range and said accelerated operation is determined to have ended by said end-ofacceleration determining means, said acceleration criterion setting means changes said acceleration criterion to a greater value.

2. A control system according to claim 1, wherein said vehicle speed state detection means is vehicle speed detection means for detecting a running speed itself of said vehicle; and when the vehicle speed detected by said vehicle speed detection means is not lower than a predetermined vehicle speed and said accelerated operation is determined to have ended by said end-of-acceleration determining means, said acceleration criterion setting means changes said acceleration criterion set by to said greater value.

3. A control system according to claim wherein said vehicle speed state detection means is gear ratio detection means for detecting a gear ratio of a transmission mounted on said vehicle; and when said gear ratio detected by said gear ratio detection means is a high gear ratio and said accelerated operation is determined to have ended by said end-of-acceleration determining means, said acceleration criterion setting means changes said acceleration criterion to said greater value.

4. A control system according to claim 1, wherein said vehicle speed state detection means comprises vehicle speed detection means for detecting a running speed itself of said vehicle and gear ratio detection means for detecting a gear ratio of a transmission mounted on said vehicle; and when said vehicle speed detected by said vehicle speed detection means is not lower than a predetermined vehicle speed, said gear ratio detected by said gear ratio detection means is a high gear ratio and said accelerated operation is determined to have ended by said end-of-acceleration determining means, said acceleration criterion setting means changes said acceleration criterion to said greater value.

5. A control system according to claim 1, wherein when a running speed detected by said vehicle speed state detection means is in a high speed range and said accelerated operation is determined to have ended by said end-of-acceleration determining means, said acceleration criterion setting means changes said acceleration criterion to a greater value for a preset period of time and, when said preset period of time has elapsed, sets said greater value back to said acceleration criterion.

6. A control system according to claim 5, wherein said vehicle speed state detection means is vehicle speed detection means for detecting a running speed itself of said vehicle; and when said vehicle speed detected by said vehicle speed detection means is not lower than a predetermined vehicle speed and said accelerated operation is determined to have ended by said end-of-acceleration determining means, said acceleration criterion setting means changes said acceleration criterion to said greater value for said preset period of time and, when said preset period of time has elapsed, sets said greater value back to said acceleration criterion.

7. A control system according to claim 5, wherein said vehicle speed state detection means is gear ratio detection means for detecting a gear ratio of a transmission mounted on said vehicle; and when said gear ratio detected by said gear ratio detection means is a high gear ratio and said accelerated operation is determined to have ended by said end-of-acceleration determining means, said acceleration criterion setting means changes said acceleration criterion to said greater value for said preset period of time and, when said preset period of time has elapsed, sets said greater value back to said acceleration criterion.

8. A control system according to claim 5, wherein said vehicle speed state detection means comprises vehicle speed detection means for detecting a running speed itself of said vehicle and gear ratio detection means for detecting a gear ratio of a transmission mounted on said vehicle; and when said vehicle speed detected by said vehicle speed detection means is not lower than a predetermined vehicle speed, said gear ratio detected by said gear ratio detection means is a high gear ratio and said accelerated operation is determined to have ended by said end-of-acceleration determining means, said acceleration criterion setting means changes said acceleration criterion to said greater value for said preset period of time and, when said preset period of time has elapsed, sets said greater value back to said acceleration criterion.

9. A control system according to claim 5, further comprising:

a bypass passage arranged bypassing a throttle valve of said internal combustion engine;

a bypass valve disposed in said bypass passage to regulate the amount of an air-fuel mixture to be fed to said internal combustion engine;

an actuator for driving said bypass valve; and valve control means for outputting a control signal to control said actuator so that the opening of said bypass valve is increased during said lean-burn operation of said internal combustion engine but is decreased during said accelerated operation of said internal combustion engine.

10. A control system according to claim 9, wherein said actuator is a negative-pressure actuator operable responsive to a negative pressure of said internal combustion engine and designed to increase the opening of said bypass valve when supplied with a negative pressure, an electromagnetic valve is additionally provided to control the supply of the negative pressure to said negative-pressure actuator, and said valve control means outputs a control signal to said electromagnetic valve to control said actuator.

* * * * *